(12) United States Patent
Storck et al.

(10) Patent No.: US 6,202,506 B1
(45) Date of Patent: Mar. 20, 2001

(54) BICYCLE CRANK

(75) Inventors: Markus Storck, Bad Camberg; Thomas Mertin, Alt Duvenstedt, both of (DE)

(73) Assignee: Storck Bicycle GmbH (DE)

( * ) Notice: Subject to any disclaimer, the term of this patent is extended or adjusted under 35 U.S.C. 154(b) by 0 days.

(21) Appl. No.: 09/180,725

(22) PCT Filed: May 14, 1997

(86) PCT No.: PCT/EP97/02470

§ 371 Date: Jul. 9, 1999

§ 102(e) Date: Jul. 9, 1999

(87) PCT Pub. No.: WO97/43167

PCT Pub. Date: Nov. 20, 1997

(30) Foreign Application Priority Data

May 14, 1996 (DE) .......................................... 296 08 748 U (51) Int. Cl.[7] ........................................................ B62M 3/00
(52) U.S. Cl. ............................................................. 74/594.1
(58) Field of Search ................................ 74/594.1, 594.2

(56) References Cited

U.S. PATENT DOCUMENTS

| | | |
|---|---|---|
| 3,833,242 | 9/1974 | Thompson . |
| 4,183,261 * | 1/1980 | Eiselbrecher et al. ............. 74/579 R |
| 4,811,626 | 3/1989 | Bezin . |
| 5,435,869 * | 7/1995 | Christensen ..................... 74/594.1 X |
| 5,690,034 * | 11/1997 | Schahl et al. ....................... 74/579 R |
| 5,851,459 * | 12/1998 | Chen . |
| 5,941,135 * | 8/1999 | Schlanger ........................... 74/594.1 |

FOREIGN PATENT DOCUMENTS

| | | |
|---|---|---|
| 296 00 548 U | 2/1996 | (DE) . |
| 296 08 748 U | 8/1996 | (DE) . |
| 352633A | 1/1990 | (EP) . |
| 2636386 | 3/1990 | (FR) . |

* cited by examiner

*Primary Examiner*—Mary Ann Green
(74) *Attorney, Agent, or Firm*—Ohlandt, Greeley, Ruggiero & Perle, LLC; George W. Rauchfuss, Jr.

(57) ABSTRACT

A bicycle crank with a core comprised of a durofoam substance, a fiber-reinforced plastic coating encasing the core, a bottom bracket axle fitting arrangement foamed into the core accessible through the fiber-reinforced plastic coating, and a bottom bracket axle fitting arrangement foamed into the core accessible through the fiber-reinforced plastic coating.

30 Claims, 6 Drawing Sheets

BICYCLE CRANK

FIELD OF THE INVENTION

The present invention is directed to a bicycle crank.

BACKGROUND OF THE INVENTION

Bicycle cranks comprised of aluminum alloy castings are known from the prior art, whereby on the one hand, a fitting arrangement is provided at an end of the aluminum alloy casting for the purpose of mounting a pedal, and on the other hand, a further fitting arrangement is provided for the mounting of a pedal spindle. It is also known to fit one or more gear rings on such bicycle cranks.

Disadvantages of the known bicycle cranks have proven to be the heavy weight of the bicycle crank, which in turn can cause problems with respect to structural strength, and the lack of a simple way to adapt its form to different optical and technical requirements.

SUMMARY OF THE INVENTION

Accordingly, it is a task of the present invention to devise a bicycle crank and a method for its manufacture which yields a low weight and which form can offer versatile design without increased expenditure.

This task is solved through the inventive step of the bicycle crank according to the present invention.

Preferred embodiments of the invention comprise the subjects of the dependent claims.

A particular advantage of the bicycle crank according to the present invention is that said crank can be manufactured in many different design forms and still maintain low weight and a low apparatus expenditure.

The density of the carbon-fiber reinforced plastic amounts to only 1550 kg/m$^3$, while that of aluminum is approximately 2700 kg/m$^3$. The density of the durofoam substance is even less. The end result is a dramatic reduction in the weight of the bicycle crank.

The high strength of the carbon-fiber reinforced plastic imparts the bicycle crank according to the present invention with approximately the same load capacity as conventional castings of aluminum alloy. This has been unequivocally confirmed by the appropriate corresponding load cycle tests.

The bicycle crank according to the present invention is simple to manufacture and provides an especially appealing design function when a transparent plastic is used, which allows the interlocking of the fiber laminate to be visible from the exterior.

The invention shall be further described in the following on the basis of the preferred embodiments.

DETAILED DESCRIPTION OF THE INVENTION

As the same reference numerals shall consistently refer to the same elements within the figures, the necessity of a repetitious redundant discussion of same is therefore eliminated.

Figure 1:
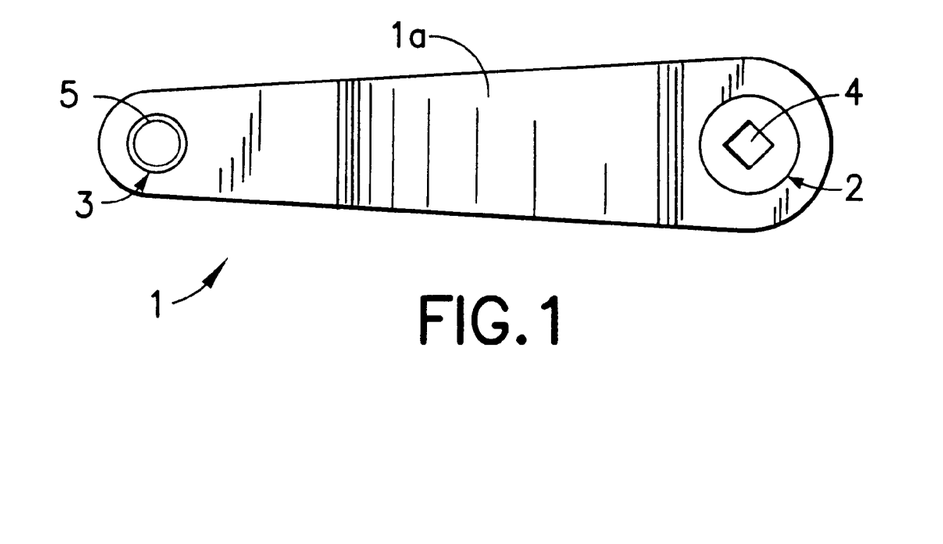
FIG. 1 front view of a bicycle crank in accordance with one of the first preferred embodiments of the present invention.

FIG. 1 is a front view of a bicycle crank according to one of the first preferred embodiments of the present invention.

FIG. 1 depicts a bicycle crank 1 with a fiber-reinforced plastic coating. The top side 1a of the fiber-reinforced plastic coating shows an opening at each end, which in each case provides accessibility for a bottom bracket axle fitting arrangement 2 and a bottom bracket axle fitting arrangement 3, both foamed into the core of the bicycle crank 1.

Preferably, the bottom bracket axle fitting arrangement 2 is of light metal, in particular an aluminum alloy of essentially cylindrical configuration which comprises a square receiving arrangement 4. Preferably, the bottom bracket axle fitting arrangement 3 is also comprised of a light metal, in particular an aluminum alloy of essentially cylindrical configuration which comprises a female thread arrangement 5.

Figure 2:
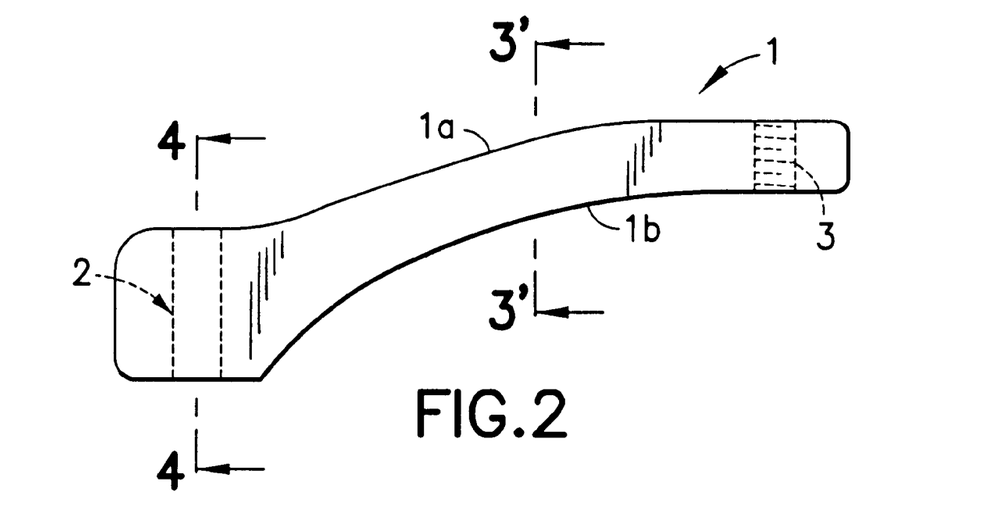
FIG. 2 side view of a bicycle crank in accordance with the first preferred embodiment of the present invention.

FIG. 2 is a side view of a bicycle crank in accordance with the first preferred embodiment of the present invention.

In FIG. 2, 1b shows the underside of the fiber-reinforced plastic coating of the bicycle crank 1 according to the present invention. The dotted lines in FIG. 2 schematically show in each case the position of the bottom bracket axle fitting arrangement 2 and the bottom bracket axle fitting arrangement 3.

The underside 1b of the fiber-reinforced plastic coating shows two of the corresponding openings on the top side 1a, which in each case provides accessibility for a bottom bracket axle fitting arrangement 2 and a bottom bracket axle fitting arrangement 3, both foamed into the core of the bicycle crank 1.

It is to be noted, however, that in principle one opening in the fiber-reinforced plastic coating for the bottom bracket axle fitting arrangement 2 on the underside 1b, and one opening in the fiber-reinforced plastic coating for the bottom bracket axle fitting arrangement on the top side 1a would be sufficient.

Figure 3:
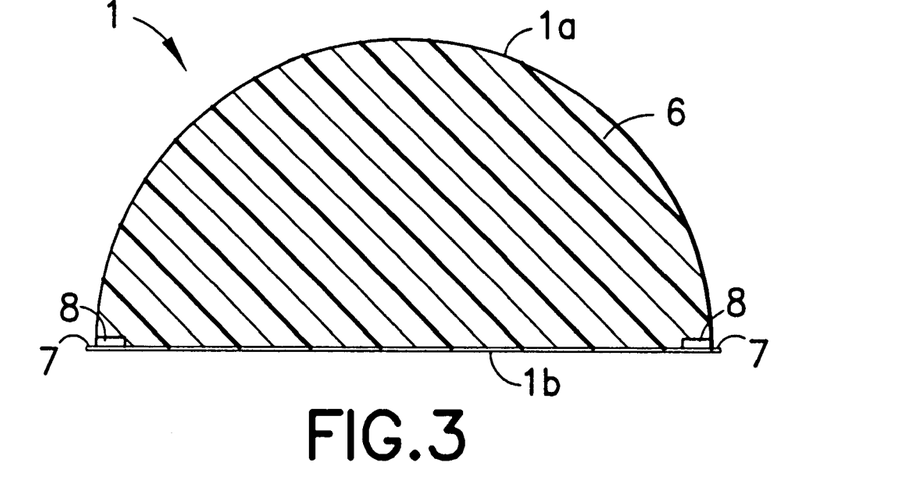
FIG. 3 cross sectional view along the line 3—3 from FIG. 2 of a bicycle crank in accordance with the first preferred embodiment of the present invention.

FIG. 3 is a cross sectional view along line 3—3 of FIG. 2 of a bicycle crank in accordance with the first preferred embodiment of the present invention.

The core 6 of the bicycle crank 1 is comprised of a durofoam material, into which the bottom bracket axle fitting arrangement 2 and the bottom bracket axle fitting arrangement 3 are foamed. The durofoam substance serves to fix the bottom bracket axle fitting arrangement 2 and the bottom bracket axle fitting arrangement 3 and to increase the stiffness of the entire bicycle crank 1. The durofoam substance preferably consists of polyurethane foam.

As is also obvious from FIG. 3, the top side 1a of the fiber-reinforced plastic coating consists preferably of a trough-shaped element, while the underside 1b of the fiber-reinforced plastic coating consists preferably of a flat lid-shaped element joined to it. Both elements are solidly joined to each other by means of the plastic.

As is expedient, the lid-shaped element shows an overlap edge 7 and is canted inwardly in the contact joining area 8 with the trough-shaped element. This additionally increases the stability of the bicycle crank 1 and allows for an appealing optical design.

The fiber-reinforced plastic coating may, in general, also be comprised of several layers of fiber laminate. It is thereby preferable to utilize a plastic which is transparent in order to allow the interlocking of the fiber laminate to be visible to the exterior, thereby providing a interesting optical appearance.

Figure 4:
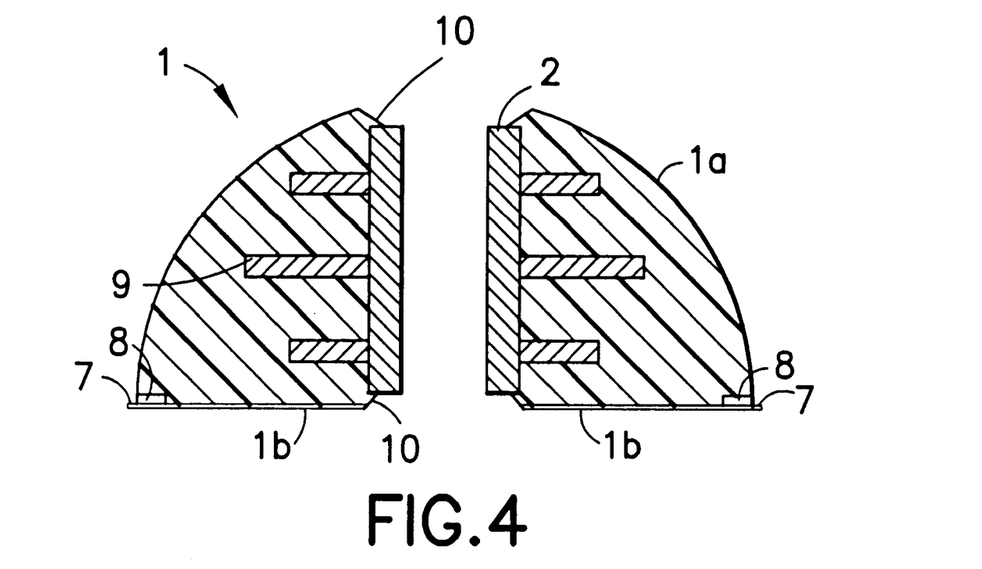
FIG. 4 further cross sectional view along the line 4—4' from FIG. 2 of a bicycle crank in accordance with the first preferred embodiment of the present invention.

FIG. 4 is a further cross-sectional view along the line 4—4 in FIG. 2 of the bicycle crank according to the first preferred embodiment of the present invention.

The cross sectional view shown in FIG. 4. shows the area of the bottom bracket axle fitting arrangement 2. It is to be noted, however, that the corresponding area of the bottom bracket axle fitting arrangement 3 is constructed analogously.

The bottom bracket axle fitting arrangement 2 is, as mentioned above, preferably of essentially cylindrical configuration. Band-shaped disks 9 are positioned at the circumference of the cylinder. These disks 9 serve to increase the connecting solidity of the bottom bracket axle fitting arrangement 2 foamed into the durofoam material, because they enlarge the contact surface in connection with the durofoam material. In particular, said durofoam material situated between disks 9 consequently prevents a contorting and slipping of the bottom bracket axle fitting arrangement 2.

It should be noted that additional plastic, for example that utilized for the fiber-reinforced plastic coating, may be supplementally provided beyond the durofoam substance itself, in particular in the area of the bottom bracket axle fitting arrangement 2 configuration; said additional plastic utilized for the purpose of increasing the solidity of the connection to an even higher degree.

It is further recognized in FIG. 4 that an access opening 10 is conically depressed into the fiber-reinforced plastic coating in the bottom bracket axle fitting arrangement 2 region, as well on the top side 1a and also on the underside 1b.

The first preferred embodiment represented in FIGS. 1–4 of the bicycle cable 1 according to the present invention is differentiated for the pedal crank arrangement arranged on the side opposite the chain drive.

Figure 5:
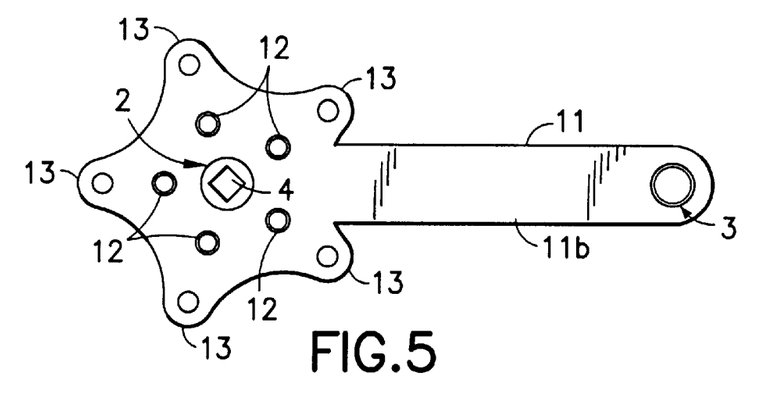
FIG. 5 front view of a bicycle crank in accordance with the second preferred embodiment of the present invention.
Figure 6:
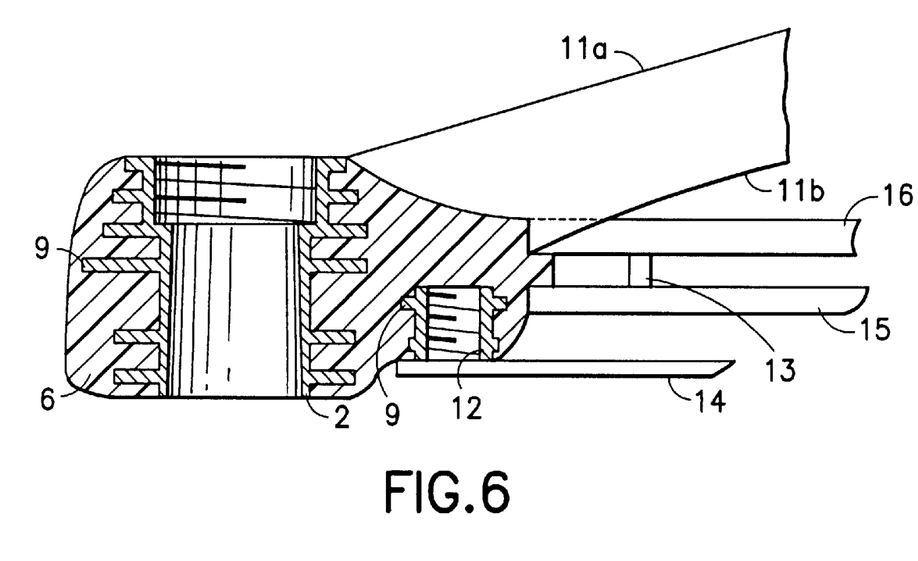
FIG. 6 enlarged partial side view of a bicycle crank in accordance with the second preferred embodiment of the present invention.

A second preferred embodiment of the bicycle cable according to the present invention is represented in FIGS. 5 and 6, expediently differentiated for the chain drive side of the of the pedal crank arrangement.

FIG. 5 is a front view of a bicycle cable according to the second preferred embodiment of the present invention.

The second preferred embodiment differs from the first preferred embodiment in its design as relates to the configuration in the bottom bracket axle fitting arrangement 2 region, as a gear ring arrangement is additionally provided. However, the connecting surface area and the region of the bottom bracket axle fitting arrangement area 3 are essentially identical in both preferred embodiments.

Reference numeral 11 in FIG. 5 refers to a bicycle crank with a fiber-reinforced plastic coating. The underside 11b of the fiber-reinforced plastic coating shows an opening at each end exactly as in the first preferred embodiment which in each case provides accessibility for a bottom bracket axle fitting arrangement 2 and a bottom bracket axle fitting arrangement 3, both foamed into the core of the bicycle crank 1.

Said second preferred embodiment of the bicycle crank 10 additionally shows a gear ring fitting arrangement comprised of two parts.

A first part 12 of the gear ring fitting arrangement contains five aluminum gear ring female threaded splines foamed into the core, accessible through the fiber-reinforced plastic coating, analogously constructed to the bottom bracket axle fitting arrangement 3, accessible however in the example shown only from the underside 11b of the bicycle crank 11. The small gear ring with the smallest diameter is preferably fastened at these threaded gear ring spline arrangements.

A second part 13 contains five annular plastic extensions, arranged peripherally about the end of the bicycle crank 10 affixed to the pedal spindle. The large and medium gear rings (compare. FIG. 6) may be fastened at these annular extensions.

FIG. 6 is an enlarged partial side view of a bicycle crank in accordance with the second preferred embodiment of the present invention.

In FIG. 6, the region of the bottom bracket axle fitting arrangement 2 and the gear ring fitting arrangement 12,13 are shown at enlarged scale. In each case, reference signs 14, 15 and 16 schematically show only a partial representation of small, medium and large gear rings.

In accordance with the first preferred embodiment described above, the corresponding form of the bicycle crank 1 on the side opposite the chain drive is represented left of the vertical center line, whereas the detailed characteristics of the gear ring fitting arrangement 12,13 specified above in reference to FIG. 5 are recognized on the right of the vertical center line.

In the following, the foamed bottom bracket axle fitting arrangement, the foamed bottom bracket axle fitting arrangement and the foamed part of the gear ring fitting arrangement will be described in further detail.

Figure 7:
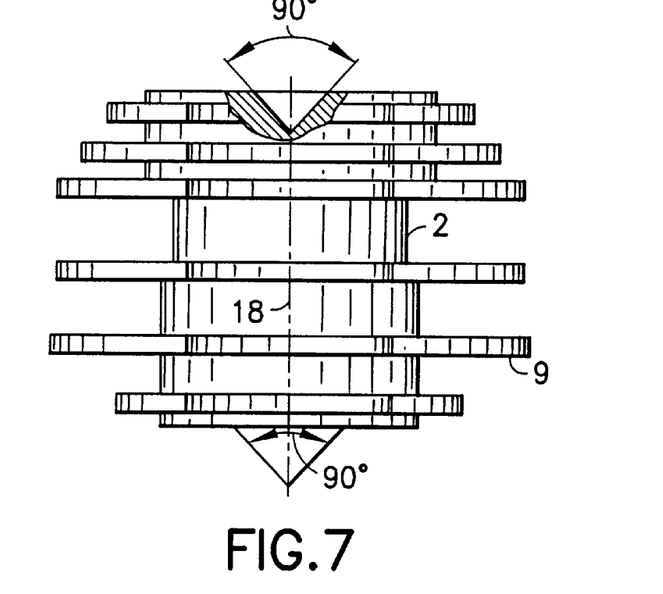
FIG. 7 cross sectional view of a particular preferred embodiment of the bottom bracket axle fitting arrangement of the bicycle crank according to the present invention.

FIG. 7 is a cross sectional view of a preferred embodiment of the bottom bracket axle fitting arrangement for the bicycle crank according to the present invention which can be implemented in both the first as also in the second preferred embodiment.

As shown in FIG. 7, the essentially cylindrical bottom bracket axle fitting arrangement 2 shows the band-shaped disks 9 circumferentially. Said band-shaped disks serve to provide stabilization within the core of the bicycle crank.

The band-shaped disks 9 preferably have different diameters. The cylinder areas between the disks 9 also preferably have different diameters. So that it is possible to precisely optimize the stability of the configuration for each individual case.

At both ends of the bottom bracket axle fitting arrangement 2 conical depressions are preferably provided having an angel of spread of, for example, 90°; said depressions intended to simplify the mounting of the pedal spindle.

Figure 8:
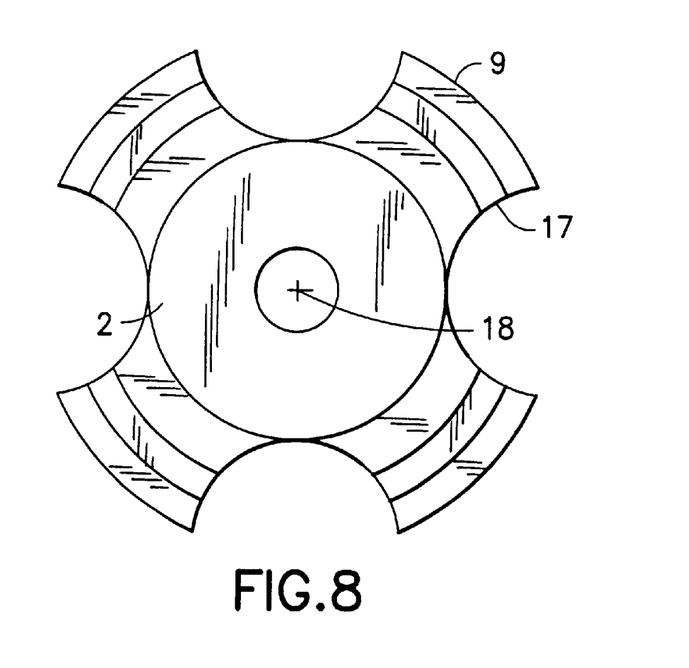
FIG. 8 front view of the preferred embodiment of the bottom bracket axle fitting arrangement of the bicycle crank according to the present invention.

FIG. 8 is a front view of the preferred embodiment of the bottom bracket axle fitting arrangement for the bicycle crank according to the present invention.

From FIG. 8, a further special feature of the bottom bracket axle fitting arrangement 2 becomes clear. The disks 9 namely show circumferential recesses 17. These recesses 17 provide for an improved stabilization against rotations of the bottom bracket axle fitting arrangement 2 about the cylinder longitudinal axis 18, as it is exactly about this axis that considerable torques come into play.

In the example shown, the recesses 17 are formed in half-circles and are positioned tangentially about each cylinder area. This type of recess is easily produced, for example using milled slots, and it confers outstanding stability.

Preferably, four recesses 17 are provided, set at 90° from one another. It is furthermore possible to offset the recesses 17 of the various disks 9 at staggered angles to each other.

The precise type, number and placement of the recesses is dependent upon the specific stability requirements of each individual case and allows for a plurality of possible modifications.

Figure 9:
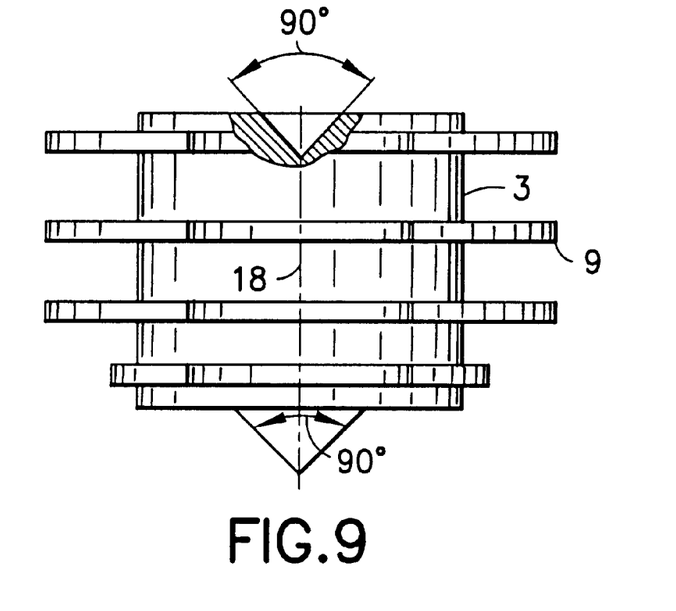
FIG. 9 cross sectional view of a particular preferred embodiment of the bottom bracket axle fitting arrangement of the bicycle crank according to the present invention.
Figure 10:
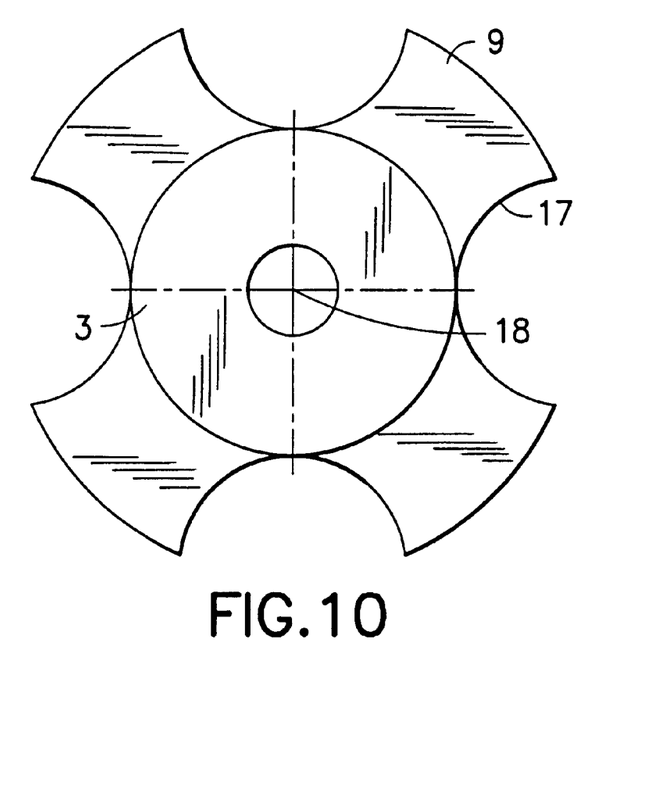
FIG. 10 front view of the preferred embodiment of the bottom bracket axle fitting arrangement of the bicycle crank according to the present invention.

FIG. 9 is a cross sectional view of a preferred embodiment of the bottom bracket axle fitting arrangement 3 for the bicycle crank in accordance with the present invention which can be implemented with the first as well as with the second preferred embodiment. FIG. 10 is a corresponding front view.

The bottom bracket axle fitting arrangement 3 represented in FIGS. 9 and 10 is constructed analogous to the bottom bracket axle fitting arrangement 2 as shown in FIGS. 7 and 8. Since it receives less force, its diameter is smaller and has fewer disks 9 than the bottom bracket axle fitting arrangement 2.

Figure 11:
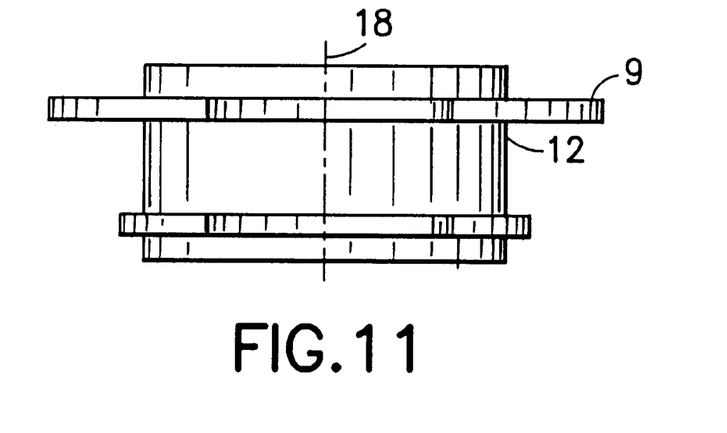
FIG. 11 cross sectional view of a particular preferred embodiment of an internal thread arrangement as an element of the gear ring fitting arrangement foamed into the durofoam-comprised core of the bicycle crank according to the present invention.
Figure 12:
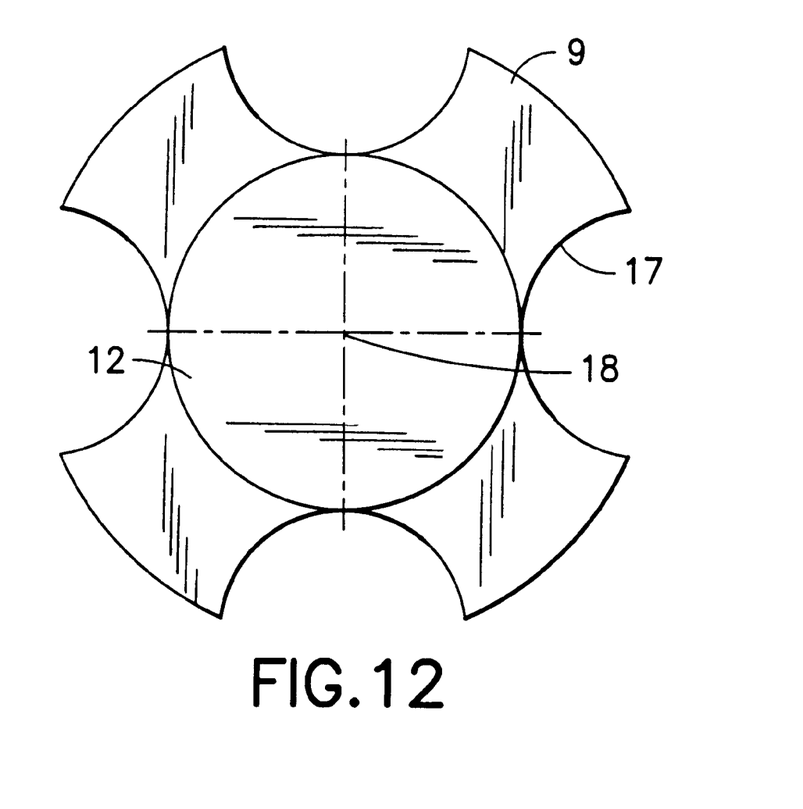
FIG. 12 front view of the preferred embodiment of the internal thread arrangement as an element of the gear ring fitting arrangement foamed into the durofoam-comprised core of the bicycle crank according to the present invention.

FIG. 11 is a cross sectional view of a particular preferred embodiments, of a female thread arrangement as an element of the gear ring fitting arrangement foamed into the durofoam-comprised core of the bicycle crank according to the present invention, which can be implemented with the second preferred embodiment. FIG. 12 is a corresponding front view.

The aluminum internal threaded arrangement foamed into the core, accessible through the fiber-reinforced plastic coating, for the mounting of the small gear ring, is also constructed analogous to the bottom bracket axle fitting arrangement 2 and the bottom bracket axle fitting arrangement 3. However it has an even smaller diameter and even fewer disks 9 than the bottom bracket axle fitting arrangement, since additional such configurations are provided, for example five as shown in FIG. 5, among which the load burden is apportioned so that the demands on an individual configuration are reduced.

In the following, the economical method for manufacture of the bicycle crank according to the present invention will be further described.

First, one or more fiber laminate layers soaked in non-hardened plastic are inserted into a preset ready mold, preferably of non-hardened plastic, so as to produce a partially open fiber-reinforced plastic coating in the mold. The plastic coating formed in this manner is, for example, trough-shaped.

The configurations of the bottom bracket axle fitting arrangement, of the bottom bracket axle fitting arrangement and, if necessary, of the gear ring fitting arrangement are inserted into the partially open fiber-reinforced plastic coating.

If increased stiffness is desired, additional non-hardened plastic can be added to the form, especially in the regions of the configurations of the bottom bracket axle fitting arrangement, the bottom bracket axle fitting arrangement and, if necessary, the gear ring fitting arrangement.

Subsequently, a foaming of the fiber-reinforced plastic coating with the durofoam material takes place.

The fiber-reinforced plastic coating is then subsequently sealed with at least one fiber laminate layer drenched in non-hardened plastic. This can in particular transpire so that the trough-shaped element cants inwards upon its side walls and a lid-shaped fiber layer of fiber-reinforced plastic is thermoset upon the canted area, which then forms an overlap edge with the trough-shaped element.

The final completion of the bicycle crank according to the present invention is achieved upon the hardening of the fiber-reinforced plastic and the durofoam.

This type of manufacture with the lid-shaped fiber laminate layer offers an additional increase in edge firmness on the one hand and, on the other hand, a handsome visual appearance.

The depressed openings in the fiber-reinforced plastic coating to provide accessibility to the bottom bracket axle fitting arrangement, the bottom bracket axle fitting arrangement and, if necessary, the gear ring fitting, are expediently hobbed in after hardening.

As described above, the present invention imparts a valuable contribution to the weight reduction and the design flexibility of bicycle cranks without thereby increasing their cost expenditure.

What is claimed is:

1. A bicycle crank comprising:
   a) a core consisting of a durofoam substance;
   b) a fiber-reinforced plastic coating encasing the core;
   c) a first bottom bracket axle fitting arrangement foamed into the core and accessible through the fiber-reinforced plastic coating; and
   d) a second bottom bracket axle fitting arrangement foamed into the core and accessible through the fiber-reinforced plastic coating.

2. The bicycle crank according to claim 1, additionally comprises a gear ring fitting arrangement for mounting of at least one gear ring.

3. The bicycle crank according to claim 2, wherein the gear ring fitting arrangement comprises at least a first part foamed into an end of the core and accessible through the fiber-reinforced plastic coating.

4. The bicycle crank according to claim 3, wherein one or more of the first bottom bracket axle fitting arrangement, the second bottom bracket axle fitting arrangement, and the first part of the gear ring fitting arrangement foamed into the core are of essentially cylindrical configuration.

5. The bicycle crank according to claim 4, wherein band-shaped disks are circumferentially provided on the essentially cylindrical configuration.

6. The bicycle crank according to claim 5, wherein the disks have circumferential recesses.

7. The bicycle crank according to claim 6, wherein said recesses are half-circle recesses.

8. The bicycle crank according to claim 7, wherein said half-circle recesses in the essentially cylindrical configuration are aligned in tangential contact.

9. The bicycle crank according to claim 6, wherein there are four recesses set at 90° from one another in each band-shaped disk.

10. The bicycle crank according to claim 5, wherein the band-shaped disks have varying diameters.

11. The bicycle crank according to claim 10, wherein cylinder regions between the disks have varying diameters.

12. The bicycle crank according to claim 3, wherein the gear ring fitting arrangement additionally comprises a second part of annular elements, arranged about an end of said bicycle crank.

13. The bicycle crank according to claim 12, wherein the annular elements are comprised of plastic and molded into the fiber-reinforced plastic coating.

14. The bicycle crank according to claim 3, wherein one or more of the first bottom bracket axle fitting arrangement, the second bottom bracket axle fitting arrangement, and the first part gear ring fitting arrangement are comprised of aluminum.

15. The bicycle crank according to claim 3, further comprising additional plastic embedded around one or more of the first bottom bracket axle fitting arrangement, the second bottom bracket axle fitting arrangement, and the first part of the gear ring fitting arrangement foamed into the core.

16. The bicycle crank according to claim 3, wherein the first part of the gear ring fitting arrangement comprises a female thread arrangement.

17. The bicycle crank according to claim 1, wherein the fiber-reinforced plastic coating has a trough-shaped part and an adjoining plate-shaped part.

18. The bicycle crank according to claim 17, wherein the trough-shaped part and the plate-shaped part form an overlap.

19. The bicycle crank according to claim 1, wherein the durofoam substance is comprised of polyurethane foam.

20. The bicycle crank according to claim 1, wherein the fiber-reinforced plastic coating consists of carbon fiber-reinforced phenol resin or epoxy resin.

21. The bicycle crank according to claim 1, wherein the fiber-reinforced plastic coating comprises one or more fiber laminate layers.

22. The bicycle crank according to claim 1, wherein one of the bottom bracket axle fitting arrangements comprises a female thread arrangement.

23. The bicycle crank according to claim 1, wherein one of the bottom bracket axle fitting arrangements comprises a square receiving arrangement.

24. The bicycle crank according to claim 1, wherein said plastic coating is transparent.

25. A bicycle crank manufactured according to a procedure comprising the following steps:
   i) introducing into a mold at least one fiber laminate layer soaked in non-hardened plastic providing a core with a partially open fiber-reinforced plastic coating;
   ii) inserting at least a first bottom bracket axle fitting arrangement and a second bottom bracket axle fitting arrangement in the partially open fiber-reinforced plastic coating;
   iii) foaming a durofoam into the partially open fiber-reinforced plastic coating;
   iv) sealing the partially open fiber-reinforced plastic coating with at least one further fiber laminate layer soaked in non-hardened plastic; and
   v) hardening the non-hardened plastic and the durofoam.

26. The bicycle crank according to claim 25, further comprising the step of inserting a gear ring fitting arrangement in the partially open fiber-reinforced plastic coating.

27. The bicycle crank according to claim 26, further comprising the step of the canting of side walls of the partially open fiber-reinforced plastic coating and subsequent thermosetting a lid-shaped fiber laminate layer to seal the fiber-reinforced plastic coating.

28. The bicycle crank according to claim 27, further comprising the step of depressing openings in the fiber-reinforced plastic coating subsequent to hardening to provide access for one or more of the first bottom bracket axle fitting arrangement, the second bottom bracket axle fitting arrangement, and the gear ring fitting arrangement.

29. The bicycle crank according to claim 28, wherein the mold into which the at least one fiber laminate layer soaked in non-hardened plastic is introduced is preset with non-hardened plastic.

30. The bicycle crank according to claim 29, further comprising step of adding a supplementary non-hardened plastic in the partially open fiber-reinforced plastic coating in the region of one or more of the first bottom bracket axle fitting arrangement, the second bottom bracket axle fitting arrangement, and the gear ring fitting arrangement.

\* \* \* \* \*